United States Patent [19]
Povlacs et al.

[11] 3,809,090
[45] May 7, 1974

[54] RUBBER ARTICLE

[75] Inventors: Lawrence J. Povlacs; William B. Crawley, both of Dothan, Ala.

[73] Assignee: Akwell Industries, Incorporated, Dotham, Ala.

[22] Filed: Sept. 21, 1972

[21] Appl. No.: 290,870

[52] U.S. Cl. .............................................. 128/294
[51] Int. Cl. ............................................. A61f 5/42
[58] Field of Search............. 128/132, 138, 294–295; 2/21

[56] References Cited
UNITED STATES PATENTS

| | | | |
|---|---|---|---|
| 2,285,981 | 6/1942 | Johns | 128/294 |
| 2,379,624 | 7/1945 | Chisnell | 2/21 |
| 2,711,737 | 6/1955 | Emery | 128/294 |
| 3,563,244 | 2/1971 | Asaka | 128/294 |
| 3,659,599 | 5/1972 | McLaughlin | 128/132 R |

*Primary Examiner*—Charles F. Rosenbaum
*Attorney, Agent, or Firm*—McNenny, Farrington, Pearne & Gordon

[57] ABSTRACT

A prophylactic device comprising a membrane-like tube having peripherally extending projections integrally formed therein is provided.

7 Claims, 4 Drawing Figures

PATENTED MAY 7 1974
3,809,090
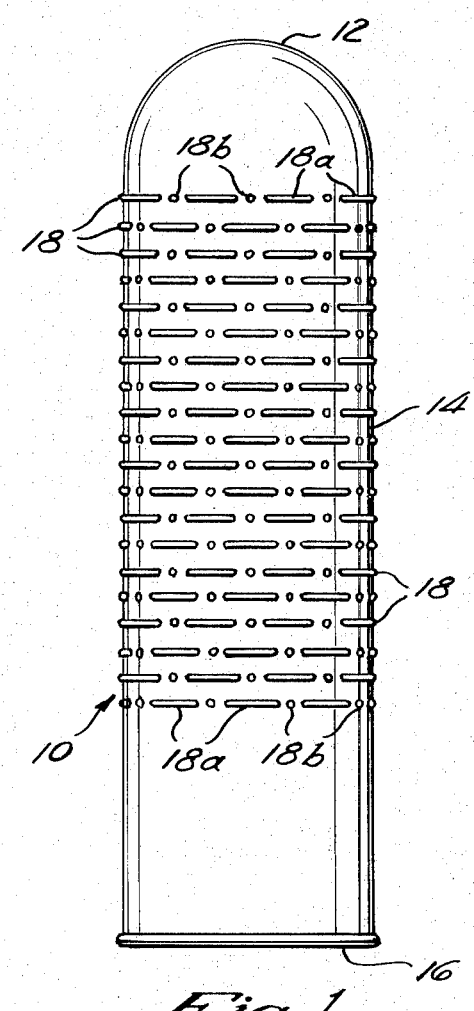
Fig. 1
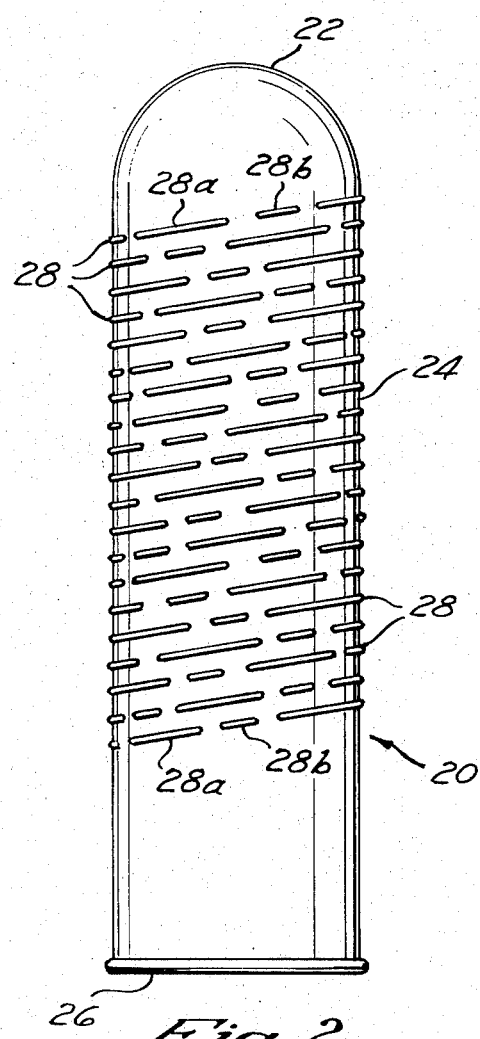
Fig. 2
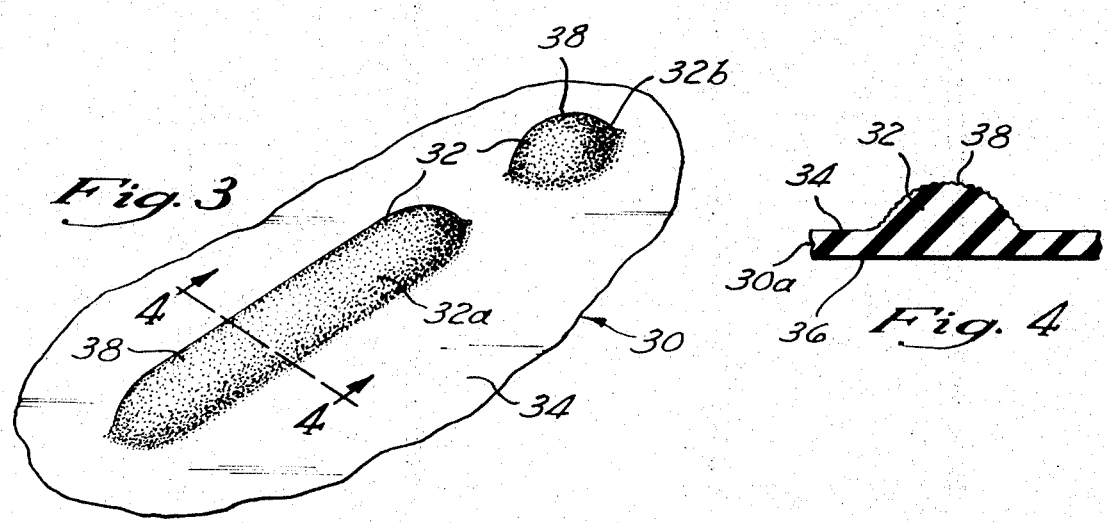
Fig. 3
Fig. 4

RUBBER ARTICLE

BACKGROUND OF THE INVENTION

The present invention relates to prophylactic devices or pellicles of the type normally employed to prevent the transmission of venereal diseases and for purposes of birth control and, more particularly, to a prophylactic device which achieves these objectives and further provides supplementary stimulation of the female during copulation. The prophylactic device includes a plurality of interrupted projections or ridges along the outside surface thereof which cooperate to define a friction generating contour for stimulating the female during copulation.

The following prior art patents are known to the applicant; U.S. Pat. Nos. 3,626,931, 2,586,674, 2,285,981 and 2,119,497.

SUMMARY OF THE INVENTION

The present invention provides a prophylactic device or pellicle comprising a tube shaped thin body of substantially homogeneous elastomeric material which is closed at one end. The pellicle includes a generally cylindrical shaped principle portion having integrally formed, peripherally extending projections. The projections are discontinuous along their length, and aligned projections cooperate to define interrupted ridges which extend along one surface of the pellicle.

In one of the disclosed embodiments, the projections include alternate ridge spans and ridge mounds which project from the outside surface of the pellicle and cooperate to define a plurality of axially spaced rings. The inside surface of the pellicle is smooth to provide elastically uniform and tight engagement.

The projections are arranged to cooperate with one another to provide the surface of the cylindrical portion of the pellicle with a friction generating contour. The pellicle wall has a thickness adjacent the projections which is about twice the thickness of the wall at locations spaced therefrom. This dimensional relationship has been found to be effective in providing a friction generating contour which effectively provides supplementary female stimulation.

BRIEF DESCRIPTION OF THE DRAWINGS

FIG. 1 is an elevational view of a prophylactic device having peripherally extending projections in accordance with the present invention;

FIG. 2 is an elevational view similar to FIG. 1 showing another embodiment of the prophylactic device;

FIG. 3 is a perspective view, on an enlarged scale, showing the details of the projections; and FIG. 4 is a sectional view of a projection taken along the line 4—4 of FIG. 3.

DETAILED DESCRIPTION OF THE DRAWINGS

Referring to FIG. 1, there is shown a prophylactic device or pellicle 10 having a closed end 12 and a major cylindrical portion 14 which terminates at an open end 16. The pellicle includes a plurality of peripherally extending projections or interrupted ridges 18 which are discontinuous along their length. As will become more apparent hereinafter, the pellicle is formed of a single, homogeneous rubber or latex material and the projections are integrally provided in the pellicle wall without significant increases in manufacturing costs.

The projections 18 include ridge spans 18a which are intermittently spaced by ridge mounds 18b. As set forth in greater detail hereinafter, the ridge spans having a width corresponding with the diameter of the ridge mounds, and their respective heigths or thicknesses are substantially equal.

The aligned ridge spans and mounds cooperate to define a plurality of rings which are axially spaced along a substantial extent of the cylindrical portion of the pellicle. Each of the spaced rings has a generally circular configuration since the plane of each of the rings is substantially perpendicular to the axis of the pellicle.

It should be appreciated that various ridge patterns and ridge lengths may be employed. However, it is preferable that the ridge pattern has a predominant orientation which is angularly disposed with respect to the axis of the cylindrical portion and pellicle. The angular orientation of the ridge pattern tends to maximize the friction generating characteristics of the ridges.

Referring to FIG. 2, a second embodiment comprising a pellicle 20 having a different ridge pattern is shown. The pellicle 20 is similar to that previously shown and it includes a closed end 22, a cylindrical portion 24 and an open end 26.

The pellicle 20 is also provided with projections or interrupted ridges 28, and aligned projections cooperate to define axially spaced rings. In this embodiment, the projections 28 include ridge spans 28a and 28b which have two different relative lengths. The aligned ridge spans are arranged in an alternating length pattern. In this instance, each of the axially spaced rings has a generally eliptical configuration resulting from the angular relationship of the plane of the ring with respect to the axis of the pellicle.

In addition to the numerous ring type patterns in which the projections may be arranged, helical patterns may also be employed. The axial spacing of such a helical ridge pattern is a function of the pitch and helix angle as measured from the axis of the pellicle. Accordingly, the axial spacing of the adjacent ridges in such a helical pattern may be altered by selecting various helix angles.

Referring to FIGS. 3 and 4, the structure of the pellicle wall and the integral formation of the projections are more clearly shown. In FIG. 3, a portion of a pellicle 30 having projections or ridges 32 is shown. The pellicle 30 is structurally identical with the pellicles 10 and 20 except for the particular ridge pattern. In FIG. 3, the length of the elongated projection 32a is reduced for purposes of illustration.

The pellicle is formed of a single latex or rubber material which is highly flexible and elastic. At locations spaced from the projections 32, the pellicle includes a base wall 30a having a uniform thickness. The projections 32 are integrally formed with the base wall of the pellicle to provide the pellicle with a substantially homogeneous wall structure having projections extending from the outside surface thereof.

The major ridge portion 32a has a length which is significantly greater than its width and height. The ridge portion has a substantially semicircular cross section along its length, and it terminates in a generally hemispherical configuration adjacent each end thereof. The ridge is provided with a fillet configuration along the base thereof to provide a concave junction between ridge and adjacent pellicle base wall. Accordingly, the radially extending contours of the ridge portion are generally arcuate.

The ridge mound 32b has a hemispherical configuration with a maximum diameter and height corresponding to the width and height of the ridge portion 32a. Similarly, the ridge mound has a fillet type configuration about its base and the radially extending contours of the ridge mound are also arcuate.

The pellicle base wall 30a includes an outer or exterior surface 34 located between the spaced projections 32 which is smooth. Similarly, the inside or exterior surface 36 of the pellicle is also smooth. In contrast, the surface 38 of the projections 32 is relatively irregular and it has a grainy texture. The irregular surface of the projections adds to the effectiveness of the pellicle in providing supplemental female stimulation.

The integral structure of the pellicle wall and the contrasting irregular and smooth surfaces thereof are simultaneously provided in the molding process of the pellicle. The pellicle is formed by the repetitive dipping of a preformed glass mandrel into a latex solution. The latex solution tends to adhere to the glass mandrel upon withdrawal from the solution, and it flows along the surface thereof to provide a uniform latex coating which ultimately forms the pellicle wall.

In order to provide the integral projections, the desired projection pattern is initially cut into the glass mandrel by means of a sand blasting technique which forms recesses in the mandrel corresponding to the projections which are to be formed. Accordingly, the recesses which are cut into the mandrel have an irregular or grainy texture resulting from the sand blasting process. The remaining portions of the glass mandrel, against which the surface 34 is formed, are smooth.

The immersion of the mandrel into the latex solution results in the formation of a pellicle having a wall including peripherally extending projections with an irregular surface or finish, and a base wall portion having a smooth surface. The inside or interior surface of the pellicle is smooth as a result of the flow properties of the latex solution which evenly distribute the latex on the mandrel during the repetitive dipping process. Prior to use the pellicle is turned inside-out so that the projections which are initially molded on the interior surface are on the outside.

The pellicle base wall is usually provided with a thickness in the range of from about 0.002 inch to about 0.003 inch and the total wall thickness at the projections ranges from about 0.006 inch to about 0.008 inch. As measured from the exterior surface 34 of the base wall, the minimum effective projection height is about 0.003 inch. However, the projection height is preferably maintained at a value of about 0.0045 inch.

It is, of course, possible to provide projections of increased thickness or height by increasing the depth of the recesses cut into the glass mandrel. For example, pellicles have been provided with projection heights as measured from the exterior surface of the base wall in the range of 0.015 inch to 0.020 inch. In such pellicles, the base wall thickness is also increased to about 0.005 inch.

Preferably the width of the projections is about 0.010 inch to 0.025 inch and the spacing of the rings is selected so that there are about ten to twelve rings formed along each inch of axial extent. With these proportions a sufficiently high density of projections is provided to produce the desired stimulation. Further, the arrangement of the projections as interrupted ridges provides increased numbers of radially extending surfaces to promote stimulation. For the same reason, it is also desirable to arrange the projections so that the spaces therebetween are not axially aligned as illustrated in FIG. 1.

As indicated above, the manufacturing process by which the ridges are integrally formed in the pellicle does not involve additional fabrication steps and the expenses associated therewith. Specifically, after the desired projection pattern has been cut into the glass mandrel, the manufacturing steps are identical with those employed to form a pellicle of uniform wall thickness.

Although preferred embodiments of this invention are illustrated, it is to be understood that various modifications may be resorted to without departing from the scope of the invention disclosed and claimed herein.

What is claimed is:

1. A prophylactic device comprising a thin body of substantially homogeneous elastomeric material having a substantially cylindrical principle portion which is closed at only one end, said cylindrical portion being formed with peripherally extending projections integrally formed therein and extending from only one surface thereof, the other surface of said cylindrical portion being substantially smooth, said projections being spaced from one another and cooperating with aligned projections to provide interrupted ridges extending around said cylindrical portion and increased numbers of radially extending projection surfaces, said cylindrical portion providing a wall of substantially constant first thickness between said projections and a second thickness at said projections which is at least about twice said first thickness.

2. A prophylactic device as set forth in claim 1 wherein said projections have at least two different length dimensions, one of said length dimensions being relatively greater than the other of said length dimensions.

3. A prophylactic device as set forth in claim 2 wherein said projections include an elongated ridge span and a ridge mound arranged in aligned circumferentially extending ridges.

4. A prophylactic device as set forth in claim 2 wherein said projections extend from the outer surface of said cylindrical portion, said cylindrical portion wall having an irregular textured finish along said projections and a relatively smooth finish between said projections.

5. A prophylactic device as set forth in claim 4 wherein said projections cooperate with one another to define a plurality of axially spaced rings extending about said cylindrical portion.

6. A prophylactic device as set forth in claim 5 wherein said spaced rings are along planes substantially perpendicular to the axis of said cylindrical portion.

7. A prophylactic device as set forth in claim 2 wherein said projections cooperate with one another to provide the surface of said cylindrical portion with a friction generating contour adapted to increase female stimulation during copulation.

* * * * *